(12) United States Patent
Kawai et al.

(10) Patent No.: US 7,676,902 B2
(45) Date of Patent: Mar. 16, 2010

(54) MANUFACTURING METHOD OF ROTOR CORE

(75) Inventors: Masaru Kawai, Mito (JP); Kouji Harada, Hitachinaka (JP); Masayuki Kobayashi, Tomobe (JP); Shinji Yamazaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 10/824,408

(22) Filed: Apr. 15, 2004

(65) Prior Publication Data

US 2004/0205955 A1 Oct. 21, 2004

(30) Foreign Application Priority Data

Apr. 16, 2003 (JP) ............................. 2003-110979

(51) Int. Cl.
*H02K 15/03* (2006.01)
(52) U.S. Cl. ........................................ 29/598; 72/354.2
(58) Field of Classification Search .................. 29/596, 29/598, 509, 510, 511, 512, 513, 520; 72/354.2, 72/354.6, 355.2, 654.6; 310/181, 263
See application file for complete search history.

(56) References Cited

U.S. PATENT DOCUMENTS

| | | | |
|---|---|---|---|
| 3,714,484 A | * | 1/1973 | Habert, Roger Jean ...... 310/263 |
| 4,117,793 A | | 10/1978 | Preece et al. |
| 4,759,117 A | | 7/1988 | Kato |
| 2002/0138968 A1 | * | 10/2002 | Kato et al. .................... 29/598 |

FOREIGN PATENT DOCUMENTS

| | | |
|---|---|---|
| EP | 0580208 | 1/1994 |
| JP | 61128749 A | 6/1986 |
| JP | 62100150 A | 5/1987 |
| JP | 06-048897 | 2/1994 |
| JP | 09-098556 | 4/1997 |
| JP | 2003018793 A | 1/2003 |

* cited by examiner

*Primary Examiner*—A. Dexter Tugbang
*Assistant Examiner*—Livius R Cazan
(74) *Attorney, Agent, or Firm*—Crowell & Moring LLP

(57) ABSTRACT

In order to realize a method of forming a rotor core that improves the productivity and enhances the product accuracy, a forming method of a rotor that is equipped with both permanent-magnet fastener on the inner perimetric end of the magnetic pole claw of the rotor core and tapered surface on the outer perimetric end on one end of the magnetic pole claw in the circumferential direction. By constraining the inner perimetric surface of the magnetic pole claw by a die and applying a forming pressure in the radial direction, the tapered surface on the outer perimetric end of the magnetic pole claw and permanent-magnet fastener on the inner perimetric end can be formed at the same time and a rotor core with high product accuracy and mass-productivity is realized.

14 Claims, 4 Drawing Sheets

MANUFACTURING METHOD OF ROTOR CORE

BACKGROUND OF THE INVENTION

The present invention relates to a rotor core or generator manufactured according to a manufacturing method of rotor core that comprises a generator rotor or a manufacturing method of generator, particularly to an AC generator for vehicle.

An AC generator consists of a rotor comprising a rotor core, on which an exciting coil is wound, to be fixed around a rotary shaft facing each other and a stator comprising an annular stator core, on which a stator coil is wound, to be mounted facing the rotor with a clearance therebetween.

The generator as above described is designed to generate dielectric electromotive power in the stator coil but, when current is generated in the stator coil, magnetic flux is generated by the armature reaction.

Due to the interaction between the magnetic flux caused by the armature reaction of the stator coil and that of the exciting coil of the rotor, a magnetic vibro-motive force is generated between the stator and rotor. It is well known that this force is transmitted to the structure, including stator core and bracket, and the vibration of the structure is then emitted as magnetic noise.

In order to attenuate the magnetic noise, it is well known that, as disclosed in the Japanese Patent Publication No. Hei 06-48897 (1994), for example, a tapered surface is provided on the rear end in the rotational direction on the outer perimetric surface of a magnetic pole claw of the rotor core protruding in the same coaxial direction.

Recently, for achieving higher output, permanent magnets have been installed between the magnetic pole claws of the rotor core mounted around a shaft facing each other. In order to hold the permanent magnet, it is well known that, as disclosed Japanese Application Patent Laid-Open Publication No. Hei 09-98556 (1997), a permanent-magnet fastener is provided on the inner perimetric end of the magnetic pole claw.

SUMMARY OF THE INVENTION

By the method according to the aforementioned Japanese Patent Publication No. Hei 06-48897, it is possible to attenuate noise while preventing the lowering of performance. However, there arises a problem that providing the tapered surface as disclosed therein requires a cutting process using a milling cutter, resulting in longer process time and also higher cost because cutting burrs need to be removed.

Forming by forging may be a solution to the above problem. However, if the rotor core is formed by conventional extrusion forging by applying a press in the axial direction only, the material flow becomes uneven because the circumferential cross section of the magnetic pole claw is asymmetric, and hence higher load is needed for forming in higher accuracy, resulting in shorter life of the dies.

It is popular that the fastener for holding the permanent magnet as disclosed in the Japanese Patent Application Laid-Open Publication Number Hei 09-98856, is cut out on the inner perimetric end of the magnetic pole claw of the rotor core or formed in one-piece when the magnetic pole claw is formed.

As explained above, the above-discussed prior art is not only disadvantageous from the view point of productivity but also in terms of improving the production accuracy because the tapered surface and the permanent-magnet fastener are formed separately.

An object of the present invention is to offer a method of forming the tapered surface that is to be formed on the outer perimetric end of the magnetic claw of the rotor core and the permanent-magnet fastener that is to be formed on the inner perimetric end at the same time or in the same process.

According to the present invention, while an intermediate blank having multiple magnetic pole claws that protrude in the same coaxial direction on a circumference and the inner perimetric surface of the magnetic pole claw are constrained by a die and a forming pressure is applied in a radial direction, the tapered surface on the outer perimetric end of the magnetic pole claw and the permanent-magnet fastener on the inner perimetric end are formed by forging at the same time or in the same process.

According to the present invention, it is preferred that the tapered surface and fastener on one end are formed at the same time on the outer perimetric end in the same circumferential direction.

According to the present invention, it is preferred that tapered surfaces and fasteners of the magnetic pole claws are formed all together while the inner perimetric surfaces of all magnetic pole claws are constrained by a die at the same time.

According to the present invention, it is preferred that the tapered surface and fastener are formed on each magnetic pole claw while the inner perimetric surface of each magnetic pole claw is constrained individually by a die.

DETAILED DESCRIPTION OF THE PREFERRED EMBODIMENTS

Figure 1:
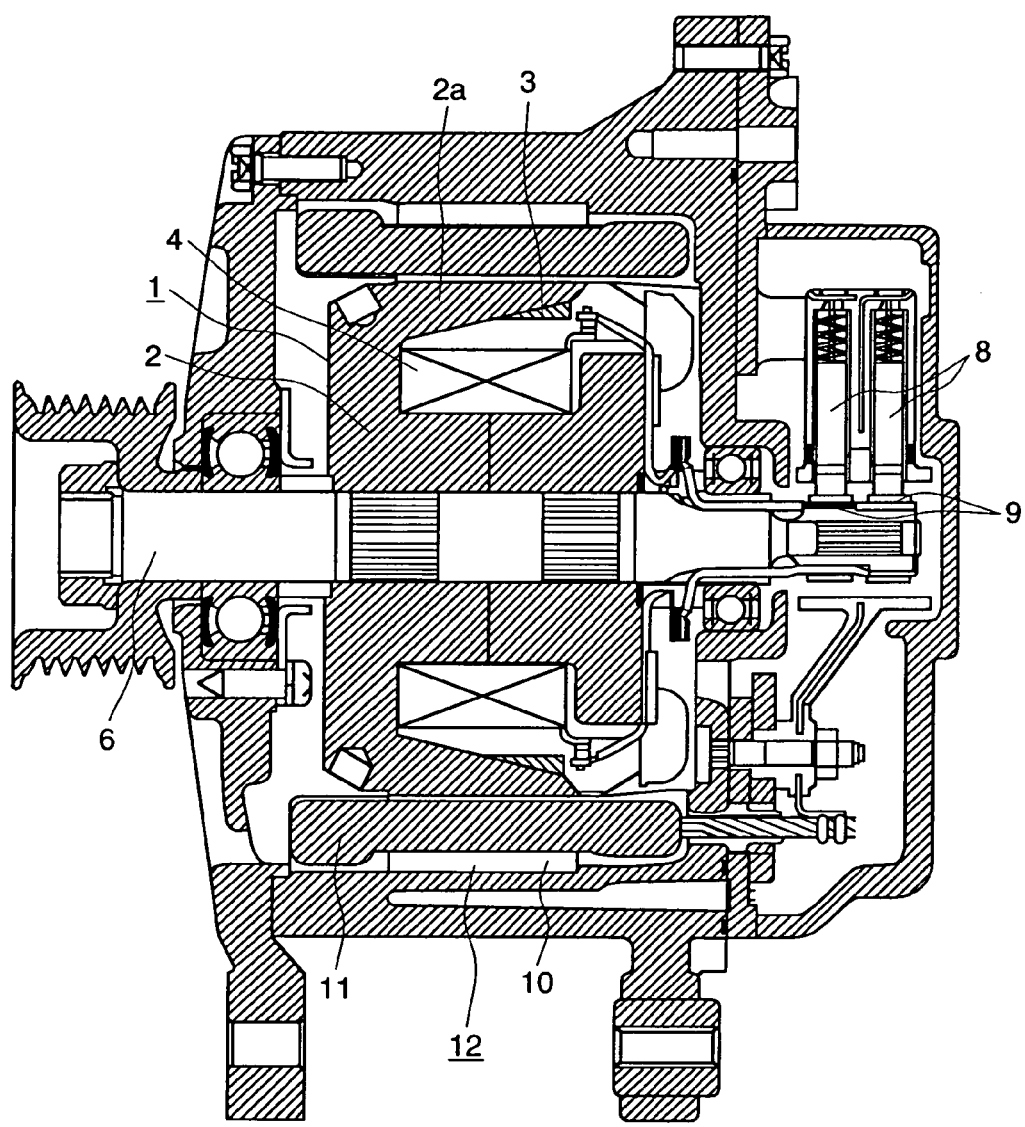
FIG. 1 is a vertical cross-sectional view of an embodiment of an AC generator for vehicle that employs a rotor core manufactured according to the present invention

The embodiment of an AC generator for a vehicle shown in FIG. 1 employs a rotor core 2 manufactured according to the present invention.

A rotor 1 comprises the rotor core 2 fixed around a rotary shaft 6. The rotor core 2 has an excitation coil 4, which is an electrically insulating bobbin on which insulation-coated conductor is wound in a number of turns, and the rotor 1 is rotated together with the rotary shaft 6. DC current is supplied to the excitation coil 4 via a slip ring comprising a brush 8 held in a brush holder and a brush ring 9 fixed on the rotary shaft 6, whereby magnetic flux is generated. Then, according to the number of poles, the rotor 1 excited by the excitation coil 4 generates N-pole and S-pole on a magnetic pole claw 2a of the rotor core 2 in the circumferential direction of the rotor. In order to increase the magneto-motive force, a permanent magnet 3 is placed and fastened between the magnetic pole claws 2a of the rotor core 2.

A stator 12 comprises a stator core 10 made of laminated steel plates in an approximately annular shape and a stator coil 11, which is a coil of insulation-coated conductor wound in a number of turns and embedded in a slot on the stator core 10.

In short, in this generator, dielectric electro-motive power is generated as the magnetic pole claw 2a of the rotor core 2 on which N-pole and S-pole are generated by the rotation of the rotor 1 interlinks with the stator coil 11, and DC current is outputted from the stator coil 11.

Figure 2:
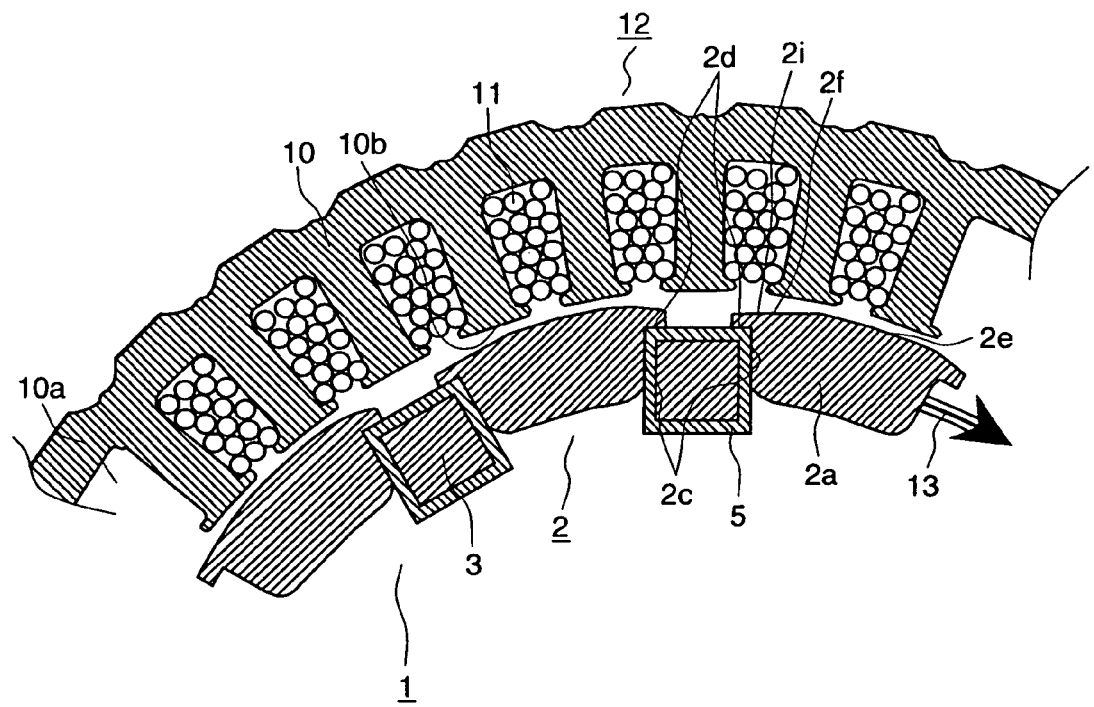
FIG. 2 is a horizontal cross-sectional view of an essential portion of FIG. 1

FIG. 2 is a horizontal cross-sectional view of an isolated portion of the rotor 1 and stator 12. The stator 12 has insulation-coated stator coils 11 embedded in the slots 10a provided on the stator core 10. While a permanent magnet 3 is mounted between the magnetic pole claws 2a, mounted to face each other, of the rotor core of the rotor 1, the permanent magnet 3 is covered with a protective cover 5 so as to prevent it from scattering around in case of crack or breakage. The permanent magnet 3 and protective cover 5 are prevented from moving outwards in the radial direction due to a centrifugal force of the rotor 1 by a permanent-magnet fastener 2d that extends from the inner perimetric end 2c of the magnetic pole claw 2a in the circumferential direction. In addition, of the outer perimetric surface 2e of the magnetic pole claw 2a, a tapered surface 2f is so formed only on the outer perimetric end 2i at the rear in the rotational direction 13 that the clearance between the inside surface 10b and the outer perimetric surface 2e of the magnetic pole claw 2a is widened in order to attenuate the noise. This tapered surface may be a curved surface approximately a taper.

Figure 3:
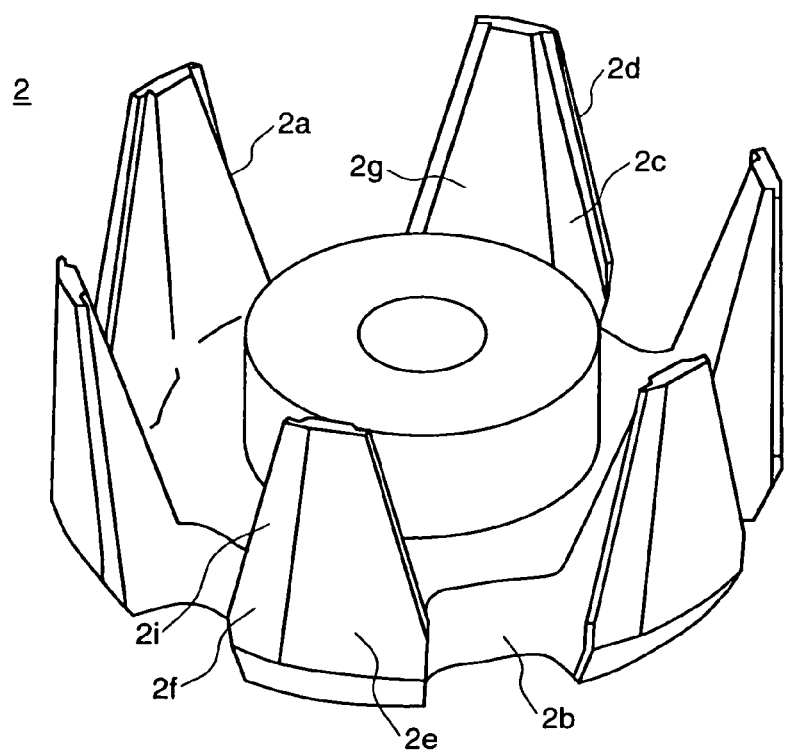
FIG. 3 is a perspective view of one embodiment of the rotor core manufactured according to the present invention

FIG. 3 is perspective view of the rotor core 2 shown in FIG. 1 and FIG. 2. There are provided both the permanent-magnet fastener 2d, extending from the inner perimetric end 2c of the magnetic pole claw 2a in the circumferential direction, for preventing the movement outwards in the radial direction and the tapered surface 2f, formed on the outer perimetric end 2i n one end of the perimetric surface 2e in the circumferential direction, for attenuating the noise. The magnetic pole claws 2a are continued or connected with each other by a plate section 2b.

Figure 4:
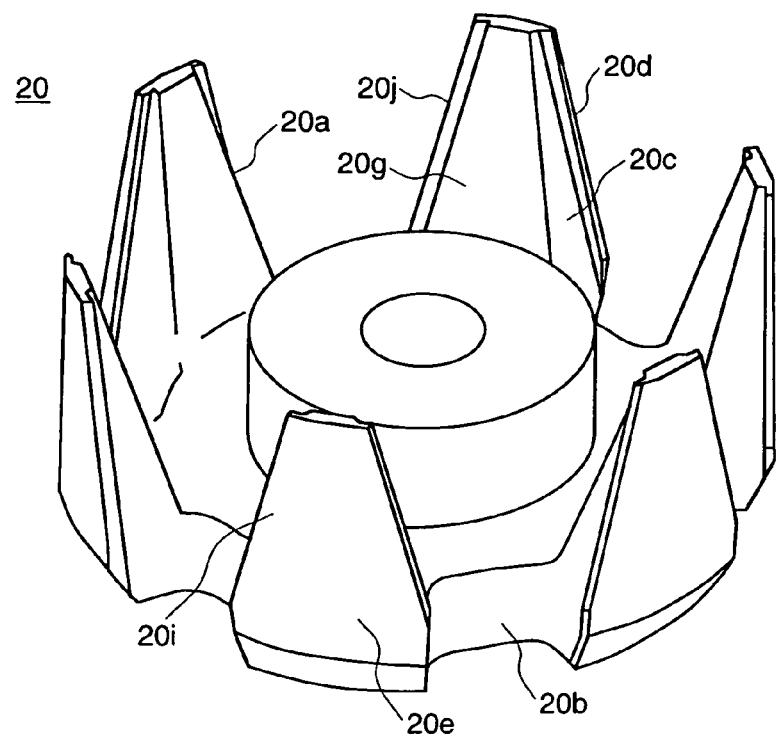
FIG. 4 is a perspective view of the intermediate blank of the embodiment of the rotor core manufactured according to the present invention

Steel material, made from magnetic substance of low carbon steel, suitable for rotor core of a DC generator is selected for the rotor core 2 and processed by a sequence that includes cutting—hot forging—cutting—lubrication—cold forging—cutting to form an intermediate blank 20 shown in FIG. 4. And then, the permanent-magnet fastener 2d and tapered surface 2f are locally cold-formed on the magnetic pole claw 2a. 2g denotes the inner perimetric surface of the magnetic pole claw of the rotor core.

Figure 5A:
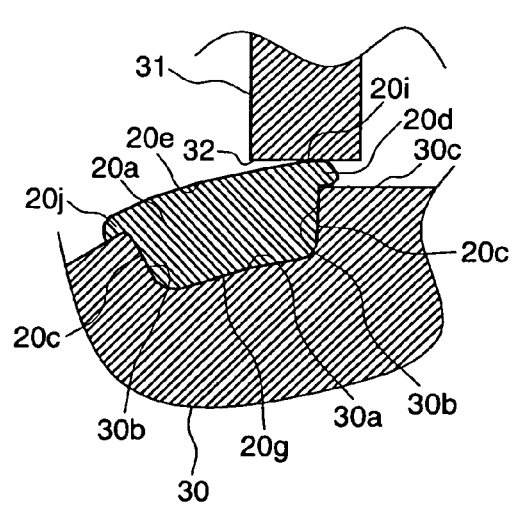
FIG. 5(a) is an enlarged cross-section of an isolated portion of the magnetic pole claw of the intermediate blank in a state just before being formed.
Figure 5B:
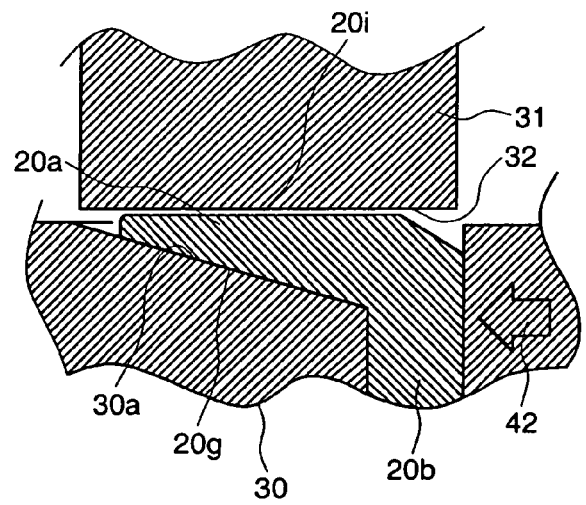
FIG. 5(b) is a vertical cross-section of an isolated portion of the magnetic pole claw of the intermediate blank in a state just before being formed.
Figure 6A:
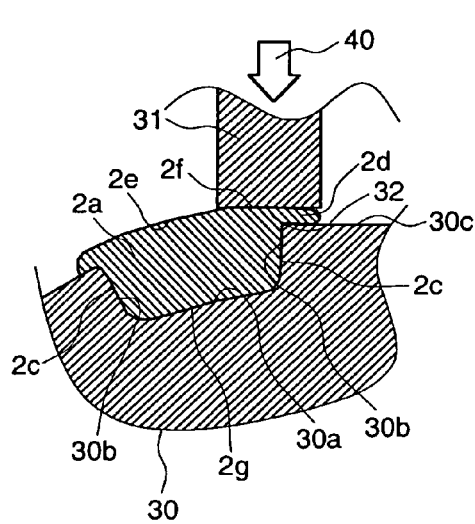
FIG. 6(a) is an enlarged cross-section of an isolated portion of the magnetic pole claw of the rotor core in a state just after being formed.
Figure 6B:
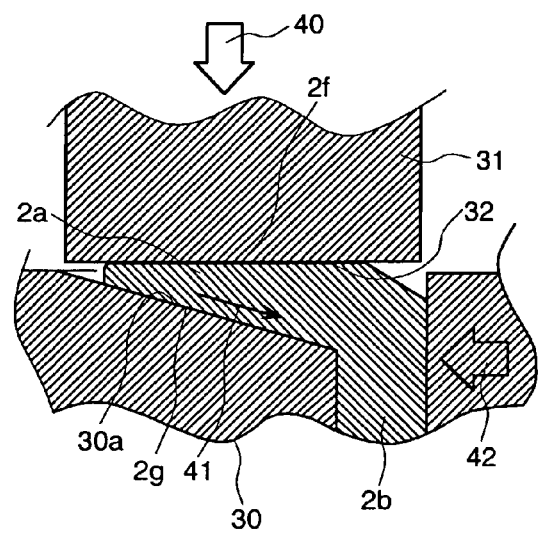
FIG. 6(b) is a vertical cross-section of an isolated portion of the magnetic pole claw of the rotor core in a state just after being formed.

FIG. 5(a) shows the cross-section of an essential portion of the magnetic pole claw 20a of the intermediate blank in a state just before being formed. FIG. 5(b) shows the vertical cross-section of an isolated portion of the magnetic pole claw 20a of the intermediate blank in a state just before being formed. FIG. 6(a) shows the cross-section of the essential portion of the magnetic pole claw 2a of the rotor core in a state just after being formed. FIG. 6(b) shows the vertical cross-section of the essential portion of the magnetic pole claw 2a of the rotor core in a state just after being formed.

The magnetic pole claw 20a of the intermediate blank as shown in FIG. 4, on which the inner perimetric surface 20g and inner perimetric end 20c of the magnetic pole claw 20a, the permanent-magnet stopper 20j on the end on which no taper is to be formed, and the plate portion 20b are all formed in finish dimensions, is mated with a fixed die 30 as shown in FIGS. 5(a) and 5(b). The shape of the die is approximately similar to that of the inner perimetric surface 20g and inner perimetric end 20c of the intermediate blank 20, and its dimensions is about the same as a finished one. The die comprises a bottom portion 30a that bears the pressure of the inner perimetric surface 20g of the magnetic pole claw 2a, side portion 30b that constrains the deformation of the inner perimetric end 20c, and forming portion 30c that bears the pressure of the fastener forming portion 20d and forms the permanent-magnet fastener 2d.

When a forming pressure 40 is applied in forming from FIGS. 5(a) and 5(b) to FIGS. 6(a) and 6(b), since the vertical cross-section of the magnetic pole claw 2a has a wedge shape, a component force 41 for moving the magnetic pole claw 2a along the bottom portion 30a of the die is generated. Accordingly, as shown in FIG. 5(b), a constraint force 42 has been applied beforehand from the direction of the plate portion 20b of the intermediate blank to fasten it. Numeral 2g denotes the inner perimetric surface of the magnetic pole claw of the rotor core.

After fastening is complete, a forming pressure 40 is applied by a forming punch 31 from the direction of the outer perimetric surface 20e of the intermediate blank 20 so as to transfer the forming surface 32 of the punch and cause a local plastic flow to the outer perimetric end 20i of the magnetic pole claw 2a. Thus, the tapered surface 2f and permanent-magnet holder 2d are formed at the same time.

In the above process, the material of the forming portion on the tapered surface 2f flows into an area left unfilled in the forging process of the intermediate blank 20, mating gap to the die 30, or outer perimetric surface 2e around the forming punch 31 although its volume is as small as 1.1% to 1.4% of that of the magnetic pole claw 2a. For the permanent-magnet fastener 2d, however, since it stretches in the circumferential direction as a result of being compressed thinner, it is recommended to adjust the volume of the fastener forming portion 20d on the intermediate blank 20. Otherwise, after forming is complete, it is permissible to trim off unnecessary portion of the permanent-magnet fastener 2d that has stretched in the circumferential direction. The bearing pressure of the forming punch 32 averages about 90 kgf/mm$^2$ in this embodiment, which is well within an allowable bearing pressure range for die steel. In addition, since plastic flow of the material is barely caused on the surface of the die, seizure or similar trouble is not practically experienced, as a result of which satisfactory surface can be maintained on the die.

According to the method as described above, it is possible to form with superior forming accuracy, less stress and friction onto the die, and less problem on the die life as compared to the extrusion forming by applying a press in the axial direction only. In addition, process time is shorter and no burr removal is needed as compared to the forming by cutting.

Since, according to the present invention, the tapered surface to be formed on the outer perimetric end of the magnetic pole claw of the rotor core and permanent-magnet fastener to be formed on the inner perimetric end can be formed at the same time, product accuracy can be higher and mass-productivity be greater.

What is claimed is:

1. A method of manufacturing a rotor core to be fixed around a rotary shaft, comprising the steps of:

constraining a circularly-shaped intermediate blank having a central axis and multiple magnetic pole claws, each magnetic pole claw protruding coaxially with the blank central axis so as to have a radial dimension defined by a circumference of the intermediate blank and an inner peripheral surface of the magnetic pole claw; and applying a forming force in a radial direction of said intermediate blank toward the blank central axis by moving a forming punch in the radial direction toward the intermediate blank and causing a local plastic flow at an outer peripheral end of each magnetic pole claw so as to form a tapered surface on only one side of said outer peripheral end and a permanent-magnet fastener on an inner peripheral end of each magnetic pole claw.

2. The method according to claim 1, wherein the tapered surface and the permanent-magnet fastener are formed during application of the forming force.

3. The method according to claim 1, wherein the tapered surface and the permanent-magnet fastener are formed simultaneously.

4. The method according to claim 1, wherein a die having multiple component parts constrains the intermediate blank and the inner peripheral surface of each magnetic pole claw.

5. The method according to claim 1, wherein the tapered surface and the permanent-magnet fastener are simultaneously formed on sides of each magnetic pole claw.

6. The method of according to claim 5, wherein the magnetic pole claws are formed at the same time while the inner peripheral surfaces thereof are simultaneously constrained by a die.

7. The method according to claim 6, wherein each magnetic pole claw is formed while the inner peripheral surface thereof is constrained individually by a die.

8. The method according to claim 1, wherein any unnecessary portion of the permanent-magnet fastener is trimmed off.

9. The method according to claim 1, wherein the tapered surface and the permanent-magnet fastener are volumetrically adjusted so as to be formed into a predetermined shape.

10. The method according to claim 1, wherein a constraint force is applied from a direction of a plate portion of the intermediate blank when the forming force is being applied in the radial direction.

11. A method of manufacturing a generator, comprising the steps of:

forging a rotor core to be fixed around a facing rotary shaft;

constraining a circularly-shaped intermediate blank having a central axis and multiple magnetic pole claws, each magnetic claw protruding coaxially with the blank central axis so as to have a radial thickness defined by a circumference of the intermediate blank and an inner peripheral surface the magnetic pole claw; and applying a forming force in a radial direction of said intermediate blank by moving a forming punch in the radial direction toward the intermediate blank central axis and causing a local plastic flow at an outer peripheral end of each magnetic pole claw so as to form a tapered surface on the outer peripheral end and a permanent-magnet fastener on an inner peripheral end of each magnetic pole claw.

12. The method according to claim 11, wherein the tapered surface and the fastener are formed simultaneously on the inner and outer peripheral ends respectively.

13. The method according to claim 11, wherein the magnetic pole claws are formed at the same time while at the same time the inner peripheral surfaces of all magnetic pole claws are constrained.

14. The method according to claim 11, wherein each of said magnetic pole claws is formed while the inner peripheral surface thereof is constrained individually by a die.

* * * * *